(12) United States Patent
Schilling

(10) Patent No.: US 9,485,213 B2
(45) Date of Patent: Nov. 1, 2016

(54) CROSS REGISTRAR COMPLIANCE AND COMMUNICATION MECHANISM

(71) Applicant: Uniregistry, Corp., Grand Cayman (KY)

(72) Inventor: Frank Schilling, Georgetown (KY)

(73) Assignee: Uniregistry, Corp., Grand Cayman (KY)

( * ) Notice: Subject to any disclaimer, the term of this patent is extended or adjusted under 35 U.S.C. 154(b) by 0 days.

(21) Appl. No.: 14/772,699

(22) PCT Filed: Mar. 20, 2014

(86) PCT No.: PCT/IB2014/060012
§ 371 (c)(1),
(2) Date: Sep. 3, 2015

(87) PCT Pub. No.: WO2014/147587
PCT Pub. Date: Sep. 25, 2014

(65) Prior Publication Data
US 2016/0065533 A1 Mar. 3, 2016

Related U.S. Application Data

(60) Provisional application No. 61/803,750, filed on Mar. 20, 2013.

(51) Int. Cl.
*G06F 15/16* (2006.01)
*H04L 29/12* (2006.01)

(52) U.S. Cl.
CPC ....... *H04L 61/1511* (2013.01); *H04L 61/1582* (2013.01); *H04L 61/302* (2013.01)

(58) Field of Classification Search
USPC ........ 709/221, 245, 238, 203, 228, 225, 226
See application file for complete search history.

(56) References Cited

U.S. PATENT DOCUMENTS

| | | | | |
|---|---|---|---|---|
| 6,421,737 B1 * | 7/2002 | Stone | .................... | H04L 43/045 709/224 |
| 6,745,248 B1 * | 6/2004 | Gardos | ............. | H04L 29/12066 707/999.01 |
| 7,076,541 B1 * | 7/2006 | Burstein | ........... | H04L 29/12066 707/999.003 |
| 7,251,826 B1 * | 7/2007 | Gardos | .................. | H04L 63/08 709/225 |
| 2005/0102354 A1 | 5/2005 | Hollenbeck | | |
| 2005/0144323 A1 | 6/2005 | Gardos | | |

(Continued)

FOREIGN PATENT DOCUMENTS

JP    2003141286    5/2003

OTHER PUBLICATIONS

International Preliminary Report on Patentability and Written Opinion, mailed Jun. 27, 2014 for PCT Application No. PCT/IB2014/060012.

*Primary Examiner* — Jude Jean Gilles
(74) *Attorney, Agent, or Firm* — Oppedahl Patent Law Firm LLC

(57) ABSTRACT

What is described is a system and method providing an improved customer experience for the registrant. The registrant is able to use a single interface and a single set of user inputs to bring about changes for multiple domain names. The single interaction with the single interface works out just as well and just as conveniently regardless of whether a single registrar happens to be handling all of the domain names, or whether each domain name is handled by a different registrar.

14 Claims, 4 Drawing Sheets

(56) References Cited

U.S. PATENT DOCUMENTS

| | | | | |
|---|---|---|---|---|
| 2007/0130284 A1* | 6/2007 | Stahura | ............... | G06Q 30/06 709/217 |
| 2007/0271393 A1* | 11/2007 | Wong | ............... | G06Q 30/08 709/245 |
| 2010/0325723 A1* | 12/2010 | Essawi | ............... | H04L 9/3226 726/20 |
| 2011/0060950 A1 | 3/2011 | Waldron | | |
| 2011/0289138 A1* | 11/2011 | Turakhia | ............... | G06F 17/30899 709/203 |
| 2012/0174198 A1* | 7/2012 | Gould | ............... | H04L 63/0807 726/6 |
| 2013/0080341 A1* | 3/2013 | Veeramachaneni | .. | G06Q 50/184 705/310 |
| 2013/0174254 A1* | 7/2013 | Gould | ............... | H04L 63/1441 726/22 |

\* cited by examiner

CROSS REGISTRAR COMPLIANCE AND COMMUNICATION MECHANISM

CROSS REFERENCE TO RELATED APPLICATIONS

This application is a non-provisional application claiming the benefits of provisional application No. 61/803,750 filed Mar. 20, 2013, the disclosure of which is hereby incorporated by reference for all purposes.

BACKGROUND

More than 192 million domain names have been registered through the interactions of Registry Operators, Registrars, and Registrants. Registrants are the individuals or organizations that hold the right to use a specific domain name. Registrants gain this right by registering the domain name with a Registrar. Registrars are accredited by an international body called the Internet Corporation for Assigned Names and Numbers (ICANN) and compete with one another to get the business of Registrants. A Registry as defined by ICANN is the authoritative, master database of all domain names registered in each Top Level Domain (TLD). A Registry Administrator or Operator keeps the master database for the TLD and also generates the Domain Name System (DNS) "zone file" for the TLD which allows computers to route Internet traffic to and from top-level domains anywhere in the world. The data of TLD zone files describe a portion of the domain name space for specific TLDs and contain information needed to resolve domain names to Internet Protocal (IP) numbers. Root servers contain the root zone file which gives the IP addresses of all the TLD zone files. The root zone file contains a list of names and numeric IP addresses of the authoritative DNS servers for all TLDs. This includes the global registries such as .com, .org, etc. as well as country-specific registries such as .fr (France), .cn (China), etc. This information is critical and if it is not 100% correct or if it is unclear, a key registry many not be locatable on the Internet. In the zone file for a particular TLD there will be entries for the various second-level domain names in that TLD. Such an entry for a particular second-level domain will contain pointers to the nameservers for that second-level domain name. Each such nameserver will contain a zone file relating to that particular second-level domain.

Zone files contain mappings between domain names and IP addresses in the form of a sequence of entries for resource records (RR). Resource records are defined by descriptions including the domain name, a time to live (TTL) field, the record class, the record type, and other type-specific data. A TTL field indicates the amount of time that a record exists before a domain name client must discard the record and re-resolve the domain name—that is, to find the corresponding IP address. Zone files specify a Start of Authority (SOA) record. The SOA record includes the name of the authoritative master DNS that supplied the data for the zone, the email address of the responsible administrator for the management of the DNS, and the serial number of the zone file which is incremented each time the zone file is changed.

Each top-level domain also has associated with it some other databases. One of these is a "Whois" database which gives contact information for each second-level domain in the top-level domain. Another is a database that keeps track (for the registry) of the particular registrar that is responsible for each second-level domain.

Historically, and as shown in FIG. 1, a Registrant 133 registers a domain name or domain names with a Registrar 134 or Registrars and provides the Registrar 134 with various contact and technical information that makes up the registration. The Registrar 134 maintains records with this information and sends it to be stored in the central directory known as the Registry. As mentioned above, a zone file contains domain names, their associated names server names and the IP addresses for those names servers. The Registry provides other computers on the Internet the information necessary to access content associated with the domain name. The Registry Operator 136 updates TLD zone files for its respective TLDs. However, the Registry (by which we mean Registry Operator) does not interact directly with the Registrant. It instead waits for the Registrar to pass on any information it is provided by the Registrant. It is possible for a Registrant to hold rights to several domain names that have the same Top-level Domain (TLD) such as .com or .net, which are tied to the same Registry, however, each domain name may be administered by a different Registrar. In cases where a Registrant has registered multiple domain names with multiple Registrars, should a Registrant want to make a general update (such as an address update) to all of its domain name registrations with the same TLD, the Registrant would be required to send the request to multiple Registrars to do so. The same would be true should the Registrant desire to change nameservers, cancel or renew a domain name, transfer a domain name to another Registrant, or other similar administrative tasks. It would be desirable to provide a more centrally controlled interface allowing a Registrant to process similar changes to multiple domain name registrations all at once, or at least in batches.

The foregoing example of the related art and limitations related therewith are intended to be illustrative and not exclusive. Other limitations of the related art will become apparent to the alert reader upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

An embodiment of the current invention provides a registrant interface that allows registrants to see and centrally request changes to their domain names though their registrant accounts. The registry operator communicates the requested changes to registrars, who are then required to act upon the changes in a timely manner. The interface insures that registrants always have a comprehensive overview of their domain names, and can perform bulk operations even when their domain names are registered with multiple registrars. Changes requested through the registrant interface will be communicated to registrars via a messaging system. In an exemplary embodiment of the invention, the changes are communicated with a REST API and a web interface which serves as the main point of contact for the registrant.

In an embodiment of the invention, the registrant interface will give registrants the ability to: view a list of domain names they control, see domain name details, and request changes to domain names. This includes but is not limited to: changing contact information, changing domain name servers, canceling/deleting a domain name, undeleting a domain name, renewing a domain name, transferring domain name to another registrant and/or registrar, Locking/Unlocking domain names, viewing the status of disputes on registrant's domain names, viewing the request queue and history for registrant's domain names, canceling pending requests, managing registrant's account, changing passwords, and updating secondary & emergency contact phone numbers.

In some embodiments of the invention, all text in the registrant interface must be easily translated. Sessions time out after a reasonable amount of time, for example after 20 minutes of inactivity. Sessions are not tied to IP addresses as some users may change IPs between requests. In an embodiment of the invention a significant GeoIP change between IPs may be considered for invalidation of sessions as a precautionary matter.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

The following is an exemplary embodiment of the invention.

Figure 1:
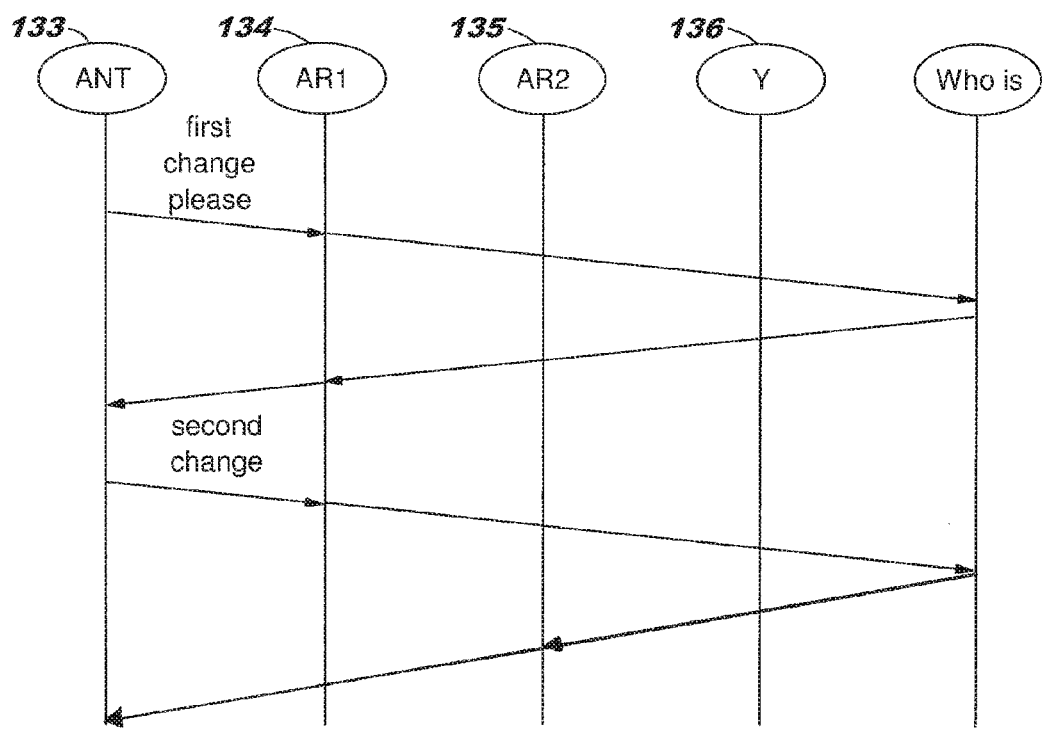
FIG. 1 is an example of the prior art.
Figure 2:
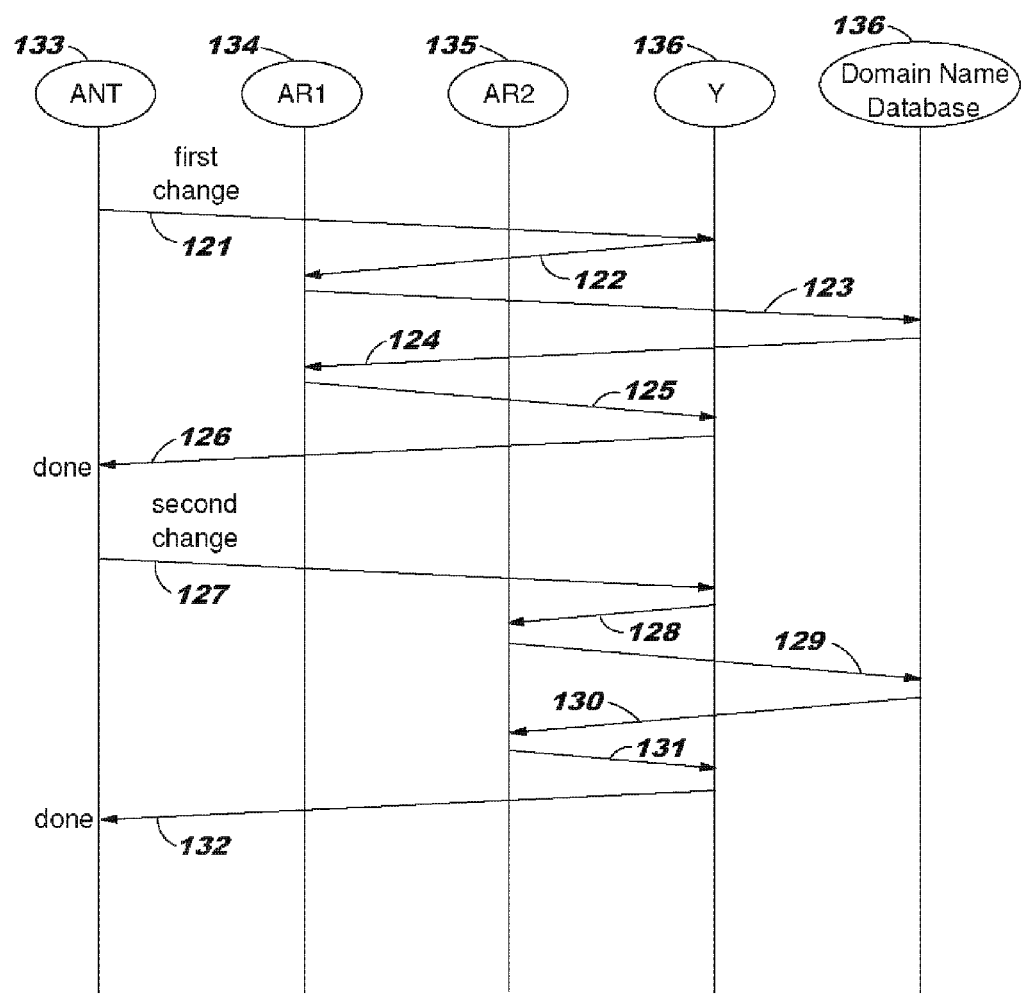
FIG. 2 is an exemplary embodiment of the methods of the invention.

The method is described with respect to FIG. 2. As will be appreciated, the method is carried out with respect to a top-level domain containing at least first and second domain names associated with a registrant 133, the first domain name associated with a respective first registrar 134, the second domain name associated with a respective second registrar 135, the top-level domain name having a zone file associated therewith, the top-level domain having an entity maintaining the zone file associated with the top-level domain, the entity defining a registry 136, the top-level domain having a domain-name database 137 associated therewith, the top-level domain having a registrar database 138 associated therewith, the registrar database containing records indicative, for each of the at least first and second domain names, of the respective registrar associated therewith, the registrar database thereby defining which registrar has authority to acknowledge or negative-acknowledge a proposed change with respect to the at least first and second domain names.

A first step of the method is receiving at the registry 136 a request from the registrant 133, the request indicative of a first proposed change 121 to the domain-name database 137 with respect to the first domain name, the request further indicative of a second proposed change 127 with respect to the second domain name. The registry 136 determines which registrar 134 corresponds to the first domain name, the determination carried out with respect to the registrar database. The registry 136 transmits at 122 to the registrar 134 corresponding to the first domain name, the first proposed change to the domain-name database with respect to the first domain name. The registry 136 determines which registrar 135 corresponds to the second domain name, the determination carried out with respect to the registrar database.

The registry 136 transmits at 128 to the registrar 135 corresponding to the second domain name, the second proposed change to the domain-name database with respect to the second domain name. The registrar 134 carries out an update of the domain name database 137 via steps 123, 124. The registrar 135 carries out an update of the domain name database 137 via steps 129, 130. The registry 136 receives a first acknowledgment 125 from the registrar 134 corresponding to the first domain name that said registrar 134 has carried out the first proposed change to the domain-name database with respect to the first domain name The registry 136 receives a second acknowledgment 131 from the registrar 135 corresponding to the second domain name that said registrar 135 has carried out the second proposed change to the domain-name database with respect to the second domain name. The registry 136 reports to the registrant 133 at 126 and 132, the first acknowledgment 125 and the second acknowledgment 131. In this example the second proposed change with respect to the second domain name might be making a change to the domain-name database 137. In this example the first proposed change to the domain-name database 137 with respect to the first domain name might be a change of contact information for the first domain name, or might be a change of name server for the first domain name, or might be a transfer of registrant for the first domain name. In this example the second proposed change with respect to the second domain name might be a lock or unlock of the second domain name or might be a renewal of the second domain name.

What will be appreciated by the alert reader is that what has just been described is in many ways better for the registrant than older approaches. Importantly, with the system just described, the registrant is able to use a single interface and a single set of mouse clicks to bring about changes for multiple domain names. The single interaction with the single interface works out just as well and just as conveniently regardless of whether a single registrar happens to be handling all of the domain names, or whether each domain name is handled by a different registrar.

To describe this from a different perspective, in the prior-art arrangement, the registrant will have to interact separately with each registrar. If there are six domain names and if each is handled by a different registrar, then the registrant would have to deal with six different user interfaces. As described here, despite the presence of six different registrars, the registrant would only have to interact once with a user interface that accommodates all six interactions at the same time. This approach is, however, very much at odds with the prior-art approach in which the registry has no direct interaction whatsoever with registrants.

Security and Setup

In embodiments of the invention, a registrant account refers to a unique login account keyed on email address. A registrant account is a virtual entity that exists when at least one domain name has a non-proxy registrant contact with a given email address (the real registrant's genuine email address). Whenever a domain name's non-proxy registrant contact has an email address that maps to an existing registrant account, that registrant account gains access to the associated domain name through the registrar interface. If a real registrant contact changes its email address, the new email address must establish a new password (unless one is already established). In exemplary embodiments of the invention, such a change is considered a change of control for the domain name.

In an exemplary embodiment of the invention, all security credentials related to a registrant account will be maintained in association with the email address, and not with contact objects. This ensures that once a transfer of ownership occurs, prior controllers/registrants will lose access to the domain so long as the real email address on file for the domain changes.

In further embodiments of the invention, the registrant's real email address must be genuine. Proxies are not permitted, and the email address must be the email address of the actual paying registrant. Registrars are not permitted to circumvent this requirement nor act as an intermediary or stakeholder. In some embodiments of the invention, should registrants or registrars attempt to use proxies or a non-genuine email address, it may result in de-accreditation and domain name cancellation. In embodiments of the invention, the Registry Operator will provide Extensible Provisioning Protocol (EPP) extensions that registrars must use to provide the registrant's real contact information including real email address, while still allowing them to offer services such as privacy or proxy services. Although it is realized that there may be a legitimate need for proxy registrations and for additional privacy services, embodiments of the invention require genuine contact information to be provided to the registry.

It may be appreciated that the way EPP operates, and consequently, the way registrants interact with registrars (especially when dealing with multiple registrars) results in multiple contact objects with the same email address. Additionally, those contact objects may also be referenced as admin, billing and tech contacts. To further complicate the matter, there are legitimate reasons for registrants to have multiple contact objects with different registrant names by sharing the same email address. For example, lawyers or escrow services may act on behalf of or as a proxy to multiple genuine registrants. In embodiments of the invention where that is the case, only the registrant's genuine email address will be used as the primary key for grouping registrant data and for logging into the registrant interface.

Embodiments of the invention will extend EPP to allow contact objects to be marked as real/genuine or proxy. All contact objects marked as proxy may link to a real/genuine type object. When a proxy type contact is used as a registrant contact, there must be a real/genuine object linked to the proxy contact. The real/genuine registrant contact object must contain the genuine registrant contact email address of the ultimate customer. No registrar proxies are permitted for the registrant contact object. Embodiments of the invention mirror or duplicate the data storage requirements of the registrants in order to allow a registry operator to provide a similar level of customer service compared to that of the registrars when contacted by registrants. In addition, in some embodiments of the invention, smaller registrars can utilize the registrar interface when proxy objects are involved without a need to cross reference against the smaller registrar's own system.

In exemplary embodiments of the invention, if the proxy type contact object information for a domain changes, a new contact must not be created. Instead, the proxy object must be modified. This is true whether the changes are due to automatic rotation of email addresses and contact information, or due to any other changes. In the event that the real/genuine contact data must be revealed in WHOIS, the registrar 134 should track the object-id of the proxy contact on the domain and re-use the proxy contact object later when privacy is re-enabled. If this is impractical to track, or if privacy might not be re-enabled automatically, the proxy contact should be deleted immediately (if unreferenced).

In embodiments of the invention, the registry operator 136 requires the following information about registrants 133, in addition to the real/genuine data requirements described above. At registration time, registrars 134 are required to obtain both a secondary email address and an emergency contact phone number from registrants, which are then sent, for example via EPP to the registry 136. The secondary email address and an emergency contact phone number are not visible in WHOIS output. Registrars 134 are encouraged in exemplary embodiments of the invention to allow registrants to update this information. These fields must be real and may not be provided on proxy contact objects. They must be provided on any contact object used as a real/genuine registrant contact.

In an exemplary embodiment of the invention, a registrar's intake form, which collects the contact information described above, will be required to indicate generally that "the collected information will be passed on to the registry, which is the registry operator to .EXTENSION names for your security and ease of management in the future". Further the form will generally note that the information will not be punished in WHOIS and is for account recovery purposes if the primary email contact is no longer accessible. Registrars may indicate in the form that emergency phone numbers be mobile numbers.

Registrant Authentication

Initial Login

A registrant logs into the registrant interface with their (primary) real/genuine registrant email address and password. If the registrant has not yet established a password, they may access an "I have not set my password" or similar link on the login page, which will take the user to an establish/forgot password form. If the user attempts to log in by entering an invalid password, the invalid password response will also link to an establish/forgot password form. The establish/forgot password form will ask for an email address. The form may have a reCaptcha or similar on it. On submission, an email with a token-containing link that expires over some period of time, for example in 6 hours, will be sent to the registrant's email address (primary only, not secondary). In an exemplary embodiment only 1 token may be valid at a time and must be long enough to avoid random guessing of tokens. Once the registrant clicks on the link, they must enter their email address again. If the email address matches, the registrant will be shown a form to set a password. While picking a password, the password must be typed a second time for confirmation.

Subsequent Logins

In an exemplary embodiment of the invention, if the registrant has previously established a password, they may login with their email address and password. If the user gets their password wrong five times, a password recovery button will be presented that initiates the standard password recovery procedure. Existing passwords on the account should be cleared when this procedure is initiated, and any existing sessions invalidated. They will need to follow the password establishment procedure above. The time and last IP Address (and GeoIP) of the previous login will be shown in the dashboard upon successful login.

Password Strength

In an exemplary embodiment of the invention, strong memorable passwords are preferred. Passwords should or must be at least eight characters long. They may contain UTF-8 characters (if supported by a password hashing algorithm). Password comparisons should or must be case sensitive. All password processing code should or must delete leading and trailing whitespace prior to comparison or hashing.

Registrant Interface Actions

The user interface of the registrant interface of embodiments of the current invention provides an interface for the registrant to make changes to its domain name registration(s) grouped together in a single change request regardless of the number of changes or registrations to change. The change request would then be sent to the involved registrar(s) for processing. The registrars would have the opportunity to ACK (acknowledge) upon acceptance or NACK (negatively-acknowledge) requests for various reasons. The registrars 134 will also report completion 123 if they ACK 321. The details will be provided below of how a queue of requests would be managed according to the methods of the current invention.

A registrant may view and make the following modifications utilizing the registrant interface and embodiments of the current invention:

List Domain Names:

The registrant may see what domains are associated to their registrant account. Recently expired and deleted names should be listed so that they may be recovered through renewal or undeletion. Names that have been transferred away to other registrants are not listed. In some embodiments of the invention, the names that have been transferred away may be listed for historical record keeping purposes.

Domain Name Details:

The registrant may view the details of its domain name registrations (including contacts, nameservers) providing details to assist with initiating actions targeted to that name.

Change Nameservers:

The registrant may request updates to their nameservers & nameserver IP addresses.

Edit Contact Information:

Registrants may update contact information on any of their domains including the registrant Name. If a registrant updates the registrant name, embodiments of the invention will warn them that the registrant may incur a re-registration fee from their registrar. If the registrant's real/genuine contact email address is changed, the change will be implemented after the registrar's system issues the appropriate EPP command such as <update> or <create>. When a contact is marked as proxy and has a real contact associated with it, only the real contact object should be modifiable. In embodiments of the invention, both real and proxy information should be shown, if available.

Registrants may also see and request updates to their secondary email and emergency contact phone numbers associated with their contacts. Modifications will be sent to registrars for processing.

Figure 3:
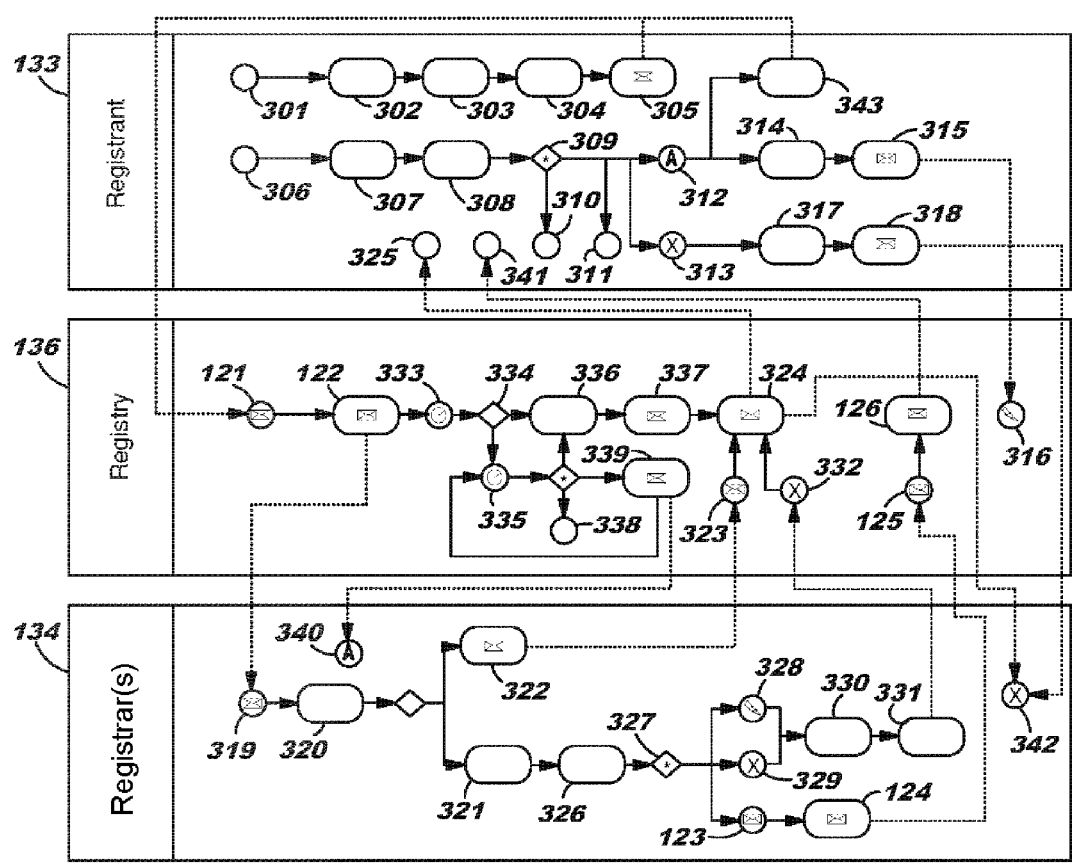
FIG. 3 is a flow diagram showing an exemplary embodiment of the invention.

Cancel/Delete a Registration:

Though the interface, a registrant may request that the registrar cancel the registration immediately (upon receipt of the request and verification of any additional authentication they may have). The registrar then would be responsible for communicating any additional associated products and services that would be cancelled and any further costs the registrant will incur as a result of such cancelation (such as early service termination penalties). As shown in FIG. 3, it should be appreciated that a cancellation request might ultimately be NAKed 322 by the registrar 134 once the implications of the change have been communicated to the registrant 133.

Renew a Domain Name:

As with other change requests, renewals can be performed in bulk or one at a time. Should they apply, maximum registration limits must be adhered to, for example a current ten-year limit. Warnings may be triggered should a registrant request a renewal for an out of the ordinary term, for example, one less than six months. In an exemplary embodiment of the invention, the warning dialog/message would allow the registrant to easily go back and adjust the registrant's selection.

Renewals are carried out by registrars upon successful payment by the registrant to the registrar. The registrar is also responsible for communicating any additional costs that may be incurred immediately or in the future related to renewals, such as hosting or privacy services. It should be appreciated that a renewal request may be NAKed by a registrar after communicating the implications of the change to the registrant for non-payment.

Undelete a Domain:

In an exemplary embodiment of the invention, a domain name can only be undeleted during the Redemption Grace Period, which may be 180 days, or possibly more or possibly less. If the domain name with deleted by the registry operator and flagged as irrevocable at the time of deletion, the previous registrant cannot undelete it. In some embodiments of the invention it shouldn't be listed on the registrant's domain name list. This is to protect against undeletions overriding enforcement-related deletions.

Undeletion will present the previously registered registrant, contacts, and nameserver information to the previous registrar for processing. Should new objects (contacts, hosts, etc.) be required to restore the domain name information to be identical to its pre-deletion state, registrars must recreate them. Registrars may also need to re-establish accounts, as the registrar must enter into a new Standardized Form of Authorization (FOA) with the registrant, and may optionally re-enroll the registrant for services. The registrant must pay the registrar for a new registration. The name must be restored to the same registrar as was in effect at time of deletion—effectively treating it as a new registration. The net result is that the name's state will be restored to the same as it was prior to deletion. For example, WHOIS output should be identical to its pre-deletion state.

Transfer of a domain name to another Registrar and/or Registrant:

A registrant may request the transfer of domain name(s) to another registrar and/or registrant at any time. The interface of embodiments of the invention will support a change of contact information, registrant name, and nameservers as well as registrar. A transfer is indicated if either the real registrant email changes or the registrar changes. A compound registrant and registrar transfer would likely occur when a registrant is pushing a domain to its new owner after a sale.

When picking a new registrant to receive the name, the sending registrant may provide full contact details or may provide simply an email address. The gaining registrar must ensure accuracy of the new information and establish accounts as appropriate, including obtaining secondary contact email and emergency contact phone numbers for the registrant.

The system will first send an initial request to the losing registrar, who will have an opportunity to ACK or send a message to the registrant on the request for example, within 24 hours. Failing to respond within the exemplary 24 hour window will result in an automatic ACK. When responding the request, the losing registrar's message will be sent to the registrant by email and via the registrant interface. When a registrar responds, the registrant must either cancel the request or continue and contact the gaining registrar. A link in the email will take the registrant directly to the appropriate request (but they must log again in to work with any other requests).

After being ACKed or continued by the registrant (in response to a message), the request will be sent to the gaining registrar for processing (which may also include rejection for valid reasons).

In the case of multiple domains, the losing registrant can respond to individual domains prior to ACKing the remaining domains. The regular transfer process takes place after the gaining registrar initiates a transfer, allowing rejection of transfers for normal reasons, providing a mechanism for legitimate transfer NAKs.

After the initial request to the losing registrar, the gaining registrar sees the request for all ACKed domains in the request.

As no existing business relationship may exist with the registrant, the gaining registrar must contact the registrant to arrange payment and to enter into an FOA with the registrant. The process followed in embodiments of the invention may be the ICANN transfer and FOA Authorization policy for transfers between registrars. At the time of contact, the gaining registrar should also ascertain what other services the registrant will be using, and obtain payment for those too, if necessary. Contact may be through any means based on the supplied information.

While transfers do not incur credit cost to either involved registrar, registrars are strongly encouraged to prompt the registrant to extend the expiry for a year and collect a payment for the renewal portion.

Lock/Unlock a domain name:

Registrants may request a lock/unlock of its names via the registrant interface of embodiments of the invention.

Manage disputes on their names:

Embodiments of the invention provide the registrant access to a list of its domain names currently in dispute. General information on handling the dispute will likely also be provided as well as links to the registrar contact for each name. Registrants will be able to manage disputes via the registrant interface.

Change password:

Embodiments of the invention permit registrants to be able to change their password through the registrant interface. In order to do so, both the current password and a new password must be entered. In some embodiments, the new passwords may be entered twice for verification. In some embodiments of the invention, getting the old password wrong a number of times, for example, five times, will log the registrant out and the process must be restarted.

View Request Queue and History

Embodiments of the invention allow a registrant to monitor pending requests as well as see the status of past requests through the registrant interface. Past requests may include both completed and cancelled/declined requests. Pending requests may be canceled before a registrar has indicated that the request has been received.

Registrant Request Queue

FIG. 3 shows an exemplary embodiment of the how registrant requests are processed by the methods of the invention. In FIG. 3, any registrant 133 initiated change request 301 will result in a new message 122, 319 for a registrar 134. Using an interface, the registrant 133 may select a domain 302, indicate change to be made 303, review changes 304, and submit the request 305. The messages will be held in a message queue 121, for example, an inbox-style message queue for processing. Both registrars 134 and registrants 133 will be able to monitor their respective queues. Registrants 133 will be able to cancel their own requests which are still in the queue. Registry operators 136 will also have the ability to monitor queues which will allow them to monitor registrars for compliance and to encourage completion of tasks within the queue if needed.

In an exemplary embodiment of the invention there will be a web interface and a REST API to manipulate the Request Queue 121. In an embodiment of the invention, the Request Queue will not be made available via EPP. In embodiments of the invention the Request Queue will be made available in a read-only manner to registrants (except for the ability to cancel a request) allowing the registrants to see the progress of their requests through monitoring option 306. Registrants 133 may view the queue 307, view request details 308, and/or check status 309. The status 309 may be completed 310, in progress or processing 311, cancelled 312, or pending 313. If the request is cancelled 312, it may be resubmitted 343 to the Registry Operator 136, or escalated 314, which then notifies 315 the Registry Operator 136, and the request is escalated 316. While a request is pending 313, the registrant 133 may cancel the request 317 and a notification 318 will be sent to the registrar 134. As previously noted, the Request Queue 121 will also be available to the Registry Operator 136.

In embodiments of the invention, once a notification of a change request is received 319 by the registrar 134, it is viewed 320 and must be acknowledged 321 or declined 322 (NAK Request) by the registrar 134 prior to acting on the received request 319. If a request is declined 322, registrars 134 may provide at least one reason for doing so. The registrant 133 will be able to see this reason after the registry 136 receives the request NAKed 323 and notifies 324 the registrant 133. A notification 325 that the request was cancelled will be received by the registrant 133. If the reason for declining should not be published to the registrant, a second optional reason can be provided to the Registry Operator (in the event of an audit or escalation). If requested changes require contacting the registrant to enter into agreements, to complete an FOA, for payment, or to resolve any other matters, registrars must do so promptly. Registrars must either initiate the requested change(s) via the registrar interface or via EPP. The registrar must mark the request as completed once the changes have been applied and their own systems have been updated to reflect the changes. Registrars have, a time limit 333, for example, 24 hours to acknowledge 334 the request and another time limit 335, for example, 24 hours, to act on it after acknowledgement. Registrars may request time extensions, which may be limited, for example to two 24 hour extensions, while attempting to act on a request. As previously noted, registrants can cancel a request 317 before it is acknowledged 321 by the registrar. This results in the request being cancelled 342. In an exemplary embodiment, if the time limit 333 expires and there was not an acknowledgement 334 requesting additional time, the request will be cancelled 336 and the registrar will be notified 337 and the registrant will be notified 324. If there was an acknowledgement 334 requesting additional time, the request is monitored. The result may be request being complete 338, no new activity leading to a warning 339 communicated to the registrar about inactivity or the request being cancelled 336. Should an inactivity warning 340 be received by the registrar 134, there may be another opportunity for a further delay 335. If and when a submitted request 305 is completed 123, the registrant eventually is notified 341 of the completion.

In embodiments of the invention, once a notification of a change request is acknowledged 321 by the registrar 134, the requested is processed 326 yielding an outcome 327 which may lead to a cancellation of a request due to being 'unable to contact a registrant' 328 or a 'registrant declining a change' 329 (perhaps based on fees). The reason for the cancellation is recorded 330, the request is cancelled 331, and a notification 332 is received by the registry operator 136. Alternatively, if the outcome 327 is that the 'request is completed' 123, changes are applied 124 and the registry operator 136 is notified 125 that the request was completed.

In an exemplary embodiment of the invention, the REST API has the following characteristics. All requests are over as secure system, for example HTPS (SSL). Authentication is required, for example app tokens+cryptographic hashing or HTTP authentication and possibly SSL Certs like EPP). Indicators are provided for the list queue including (new, open, and closed). Filters may be applied as well as data range searches providing limits on number of results and paginations. Details may be retrieved for a queue item. Status may be updated as (ACK, NAK, respond, done).

Figure 4:
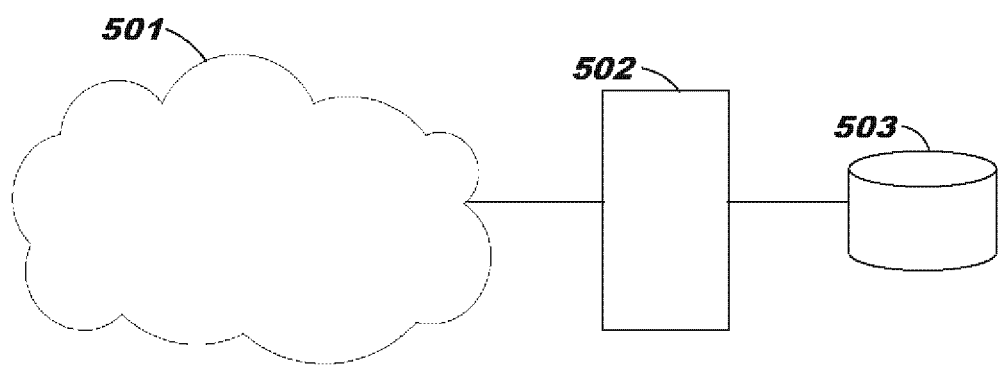
FIG. 4 shows exemplary hardware upon which the various methods of the invention may be carried out.

FIG. 4 shows exemplary hardware which may be employed to carry out the invention. For clarity the hardware is depicted with a processor 502, storage 503, and so on, connected to the Internet 501. Real-life considerations will likely prompt a system designer to implement a more complicated hardware environment. For example the designer will place a firewall (or, more likely multiple levels of protection) between the registry system and the Internet. Nonetheless the general concept is that most of the hardware will usually be selected from general-purpose processors running suitable software, connected with data storage devices such as disk drives or solid-state storage, along with suitable routers, switches, firewalls, and the like.

Miscellaneous policy considerations for embodiments of the invention with respect to registry operators to implement the registrant interface include: WHOIS Privacy policy (possibly provided by the registrars), registrant-initiated change compliance policy, dispute policy and procedures, registrant attribute collection best practices and appearance requirements for registrars, registrant account unlocking and recovering procedures.

While a number of exemplary aspects and embodiments have been discussed above, the alert reader will recognize certain modifications, permutations, additions and sub-combinations therefor. It is therefore intended that the following appended claims hereinafter introduced are interpreted to include all such modifications, permutations, additions and sub-combinations are within their true spirit and scope.

I claim:

1. A method carried out with respect to a top-level domain containing at least first and second domain names associated with a registrant, the first domain name associated with a respective first registrar, the second domain name associated with a respective second registrar, the top-level domain name having a zone file associated therewith, the top-level domain having an entity maintaining the zone file associated with the top-level domain, the entity defining a registry, the top-level domain name having a domain-name database associated therewith, the top-level domain name having a registrar database associated therewith, the registrar database containing records indicative, for each of the at least first and second domain names, of the respective registrar associated therewith, the registrar database thereby defining which registrar has authority to acknowledge or negative-acknowledge a proposed change with respect to the at least first and second domain names, the method comprising the steps of:

receiving at the registry a request from the registrant, the request indicative of a first proposed change to the domain-name database with respect to the first domain name, the request further indicative of a second proposed change with respect to the second domain name, determining, at the registry, the registrar corresponding to the first proposed change to the domain-name database with respect to the first domain name, the determination carried out with respect to the registrar database, transmitting, by the registry to the registrar corresponding to the first domain name, the first proposed change to the domain-name database with respect to the first domain name, determining, at the registry, the registrar corresponding to the second proposed change to the domain-name database with respect to the second domain name, the determination carried out with respect to the registrar database, transmitting, by the registry to the registrar corresponding to the second domain name, the second proposed change to the domain-name database with respect to the second domain name, receiving at the registry a first acknowledgment from the registrar corresponding to the first domain name that said registrar has carried out the first proposed change to the domain-name database with respect to the first domain name, receiving at the registry a second acknowledgment from the registrar corresponding to the second domain name that said registrar has carried out the second proposed change to the domain-name database with respect to the second domain name, reporting, by the registry to the registrant, the first acknowledgment and the second acknowledgment.

2. The method of claim 1 wherein the second proposed change with respect to the second domain name comprises making a change to the domain-name database.

3. The method of claim 1 wherein the first proposed change to the domain-name database with respect to the first domain name comprises a change of contact information for the first domain name.

4. The method of claim 1 wherein the first proposed change to the domain-name database with respect to the first domain name comprises a change of name server for the first domain name.

5. The method of claim 1 wherein the first proposed change to the domain-name database with respect to the first domain name comprises a transfer of registrant for the first domain name.

6. The method of claim 1 wherein the second proposed change with respect to the second domain name comprises a lock or unlock of the second domain name.

7. The method of claim 1 wherein the second proposed change with respect to the second domain name comprises a renewal of the second domain name.

8. The method of claim 2 wherein the first proposed change to the domain-name database with respect to the first domain name comprises a change of contact information for the first domain name.

9. The method of claim 2 wherein the first proposed change to the domain-name database with respect to the first domain name comprises a change of name server for the first domain name.

10. The method of claim 2 wherein the first proposed change to the domain-name database with respect to the first domain name comprises a transfer of registrant for the first domain name.

11. The method of claim 2 wherein the second proposed change with respect to the second domain name comprises a lock or unlock of the second domain name.

12. The method of claim 2 wherein the second proposed change with respect to the second domain name comprises a renewal of the second domain name.

13. The method of claim 7 further comprising the step, carried out by the registrar corresponding to the second domain name, of making payment arrangements with the registrant.

14. The method of claim 12 further comprising the step, carried out by the registrar corresponding to the second domain name, of making payment arrangements with the registrant.

* * * * *